(12) United States Patent
Kitou et al.

(10) Patent No.: US 7,333,584 B2
(45) Date of Patent: Feb. 19, 2008

(54) NUCLEAR POWER PLANT AND OPERATION METHOD THEREOF

(75) Inventors: Kazuaki Kitou, Tokyo (JP); Masao Chaki, Tokyo (JP); Kouji Shina, Tokyo (JP); Motoo Aoyama, Tokyo (JP); Masaya Ohtsuka, Tokyo (JP); Masayuki Nagasawa, Tokyo (JP); Minoru Okura, Tokyo (JP); Seiji Nemoto, Tokyo (JP); Yasuhiro Takahashi, Tokyo (JP)

(73) Assignee: Hitachi - GE Nuclear Energy, Ltd., Hitachi-shi (JP)

( * ) Notice: Subject to any disclaimer, the term of this patent is extended or adjusted under 35 U.S.C. 154(b) by 0 days.

(21) Appl. No.: 11/033,953

(22) Filed: Jan. 13, 2005

(65) Prior Publication Data

US 2005/0220253 A1    Oct. 6, 2005

(30) Foreign Application Priority Data

Jan. 14, 2004  (JP) .............................. 2004-006198
Jul. 23, 2004  (JP) .............................. 2004-215095

(51) Int. Cl.
*G21C 7/00* (2006.01)

(52) U.S. Cl. ...................... 376/241; 376/260; 376/361; 376/207

(58) Field of Classification Search ................ 376/241, 376/378, 379, 402, 217, 260, 361, 207; *G21D 3/00, G21D 3/08*
See application file for complete search history.

(56) References Cited

U.S. PATENT DOCUMENTS 3,914,795 A * 10/1975 Alliston et al. ............. 376/217
3,998,695 A * 12/1976 Cahn et al. ................ 376/322
4,003,786 A *  1/1977 Cahn .......................... 376/322
4,080,251 A *  3/1978 Musick ........................ 376/217
4,290,850 A *  9/1981 Omori et al. ............... 376/210
4,651,530 A *  3/1987 Omori ........................... 60/667
4,975,238 A * 12/1990 Regan et al. ............... 376/216

FOREIGN PATENT DOCUMENTS

| JP | 7 167988  | 7/1995  |
| JP | 8-233989  | 9/1996  |
| JP | 9-264983  | 10/1997 |

OTHER PUBLICATIONS

Noam Lior. Advanced Energy Conversion to Power. Energy Convers. Mgmt. vol. 38, No. 10-13, pp. 941-955. 1997.*
Nuclear Engineering Handbook. Harold Etherington, Editor. © 1958 McGraw-Hill Book Company, Inc. pp. 12-14 to 12-15.*
Anghaie et al. Optimum Utilization of Nuclear Fuel with Gas and Vapor Reactors. Progress in Nuclear Technology, vol. 47, No. 1-4, pp. 74-90. 2005.*

* cited by examiner

*Primary Examiner*—Ricardo J. Palabrica
(74) *Attorney, Agent, or Firm*—Crowell & Moring LLP

(57) ABSTRACT

A nuclear power plant and method of operation for augmenting a second reactor thermal power output in a second operation cycle to a level larger than a first reactor thermal power output in the previous operation cycle. The plant is equipped, for example, with a reactor; a steam loop comprising high and low pressure turbines; a condenser for condensing steam discharged therefrom the low pressure turbine; a feedwater heater for heating feedwater supplied from the condenser; and a feedwater loop for leading feedwater discharged from the feedwater heater to the reactor. The operation method includes decreasing a ratio of extraction steam which is led to the feedwater heater from a steam loop in the second operation cycle.

2 Claims, 10 Drawing Sheets

NUCLEAR POWER PLANT AND OPERATION METHOD THEREOF

This application claims the priority of Japanese application nos. JP 2004-006198, filed Jan. 14, 2004, and JP 2004-215095 filed Jul. 23, 2004, the disclosures of which are expressly incorporated by reference herein.

BACKGROUND OF THE INVENTION

1. Field of the Invention

The present invention relates to a nuclear power plant and an operation method thereof, and particularly, to augmenting a power generation capacity.

2. Description of the Related Art

In a conventional newly-constructed nuclear power plant, a power output is augmented by, for example, improving either of a composition or a shape configuration of a fuel assembly, or the like, and by increasing a main steam flow rate at an outlet of a reactor.

A technology of such a conventional example is disclosed in Japanese Patent Laid-Open Publication Hei. 9-264983.

When applying the conventional technology described above to an existing nuclear power plant, the main steam flow rate increases substantially proportional to an increase of the power output. In order to suppress an increase of the main steam flow rate, a feedwater temperature may be lowered; however, if an extraction steam for heating the feedwater is simply decreased, thermal efficiency is extensively deteriorated and the power output hardly increases. This is not realistic option. Further, the increase of the main steam flow rate decreases a design margin of pressure vessel internals such as feedwater piping, a feedwater heater, a feedwater pump, and a steam dryer, and almost all power plant components, such as a main steam pipe, a high pressure turbine, a low pressure turbine, and a condenser. In a power plant using a normal boiling water reactor, the high pressure turbine is one of the components most likely to be the first to lose its design margin due to the increase of the main steam flow rate. Also in a nuclear power plant system other than a boiling water reactor, there is a similar problem with respect to a plant having a comparatively small design margin of the high pressure turbine, such that when applying a conventional technology to augment power output to an existing nuclear power plant, large scale improvement and change of the plant instruments is required.

Consequently, there is a need for a nuclear power plant and operation method thereof that enable a power uprate of the plant without extensively changing a configuration of the plant, including its instruments.

SUMMARY OF THE INVENTION

A first embodiment of the invention to solve the above problem is, after an operation cycle (i.e., a period from an activation of a nuclear power plant to an operation stop thereof for changing fuel), to augment a second reactor thermal power output in a second operation cycle to a level larger than a first reactor thermal power output in the previous operation cycle by decreasing a ratio of extraction steam which is led to a feedwater heater from a steam loop in the second operation cycle.

A second embodiment of the invention to solve the above problem is, after an operation cycle, to augment a second reactor thermal power output in a second operation cycle to a level larger than a first reactor thermal power output in a previous operation cycle by decreasing a ratio of extraction steam which is led to a feedwater heater specifically from a middle area and an outlet of a high pressure turbine (the outlet steam extraction actually may be taken anywhere between the outlet of the high pressure turbine to any one of the inlets of a moisture separator, a moisture separator and heater, and a moisture separator and reheater).

In addition, a third embodiment of the invention to solve the above problem is to augment a second reactor thermal power output in a second operation cycle of a reactor to a level larger than a first reactor thermal power output in a previous operation cycle by decreasing a mass flow rate of extraction steam led to a feedwater heater specifically from a middle area and outlet of a high pressure turbine out of extraction steam.

In addition, a fourth embodiment of the invention to solve the above problem is to augment a second reactor thermal power output in a second operation cycle of a reactor to a level larger than a first reactor thermal power output in a previous operation cycle by decreasing a temperature rise amount at a high pressure feedwater heater placed downstream of a main feedwater pump.

In addition, a fifth embodiment of the invention to solve the above problem is to augment a second reactor thermal power output in a second operation cycle of a reactor to a level larger than a first reactor thermal power output in a first operation cycle by stopping at least not less than one loop of an extraction steam pipe specifically from a middle area and outlet of a high pressure turbine.

DESCRIPTION OF THE PREFERRED EMBODIMENTS

Here will be described an embodiment where the present invention is applied to the boiling water reactor of one of direct-cycle nuclear power plants.

Figure 1:
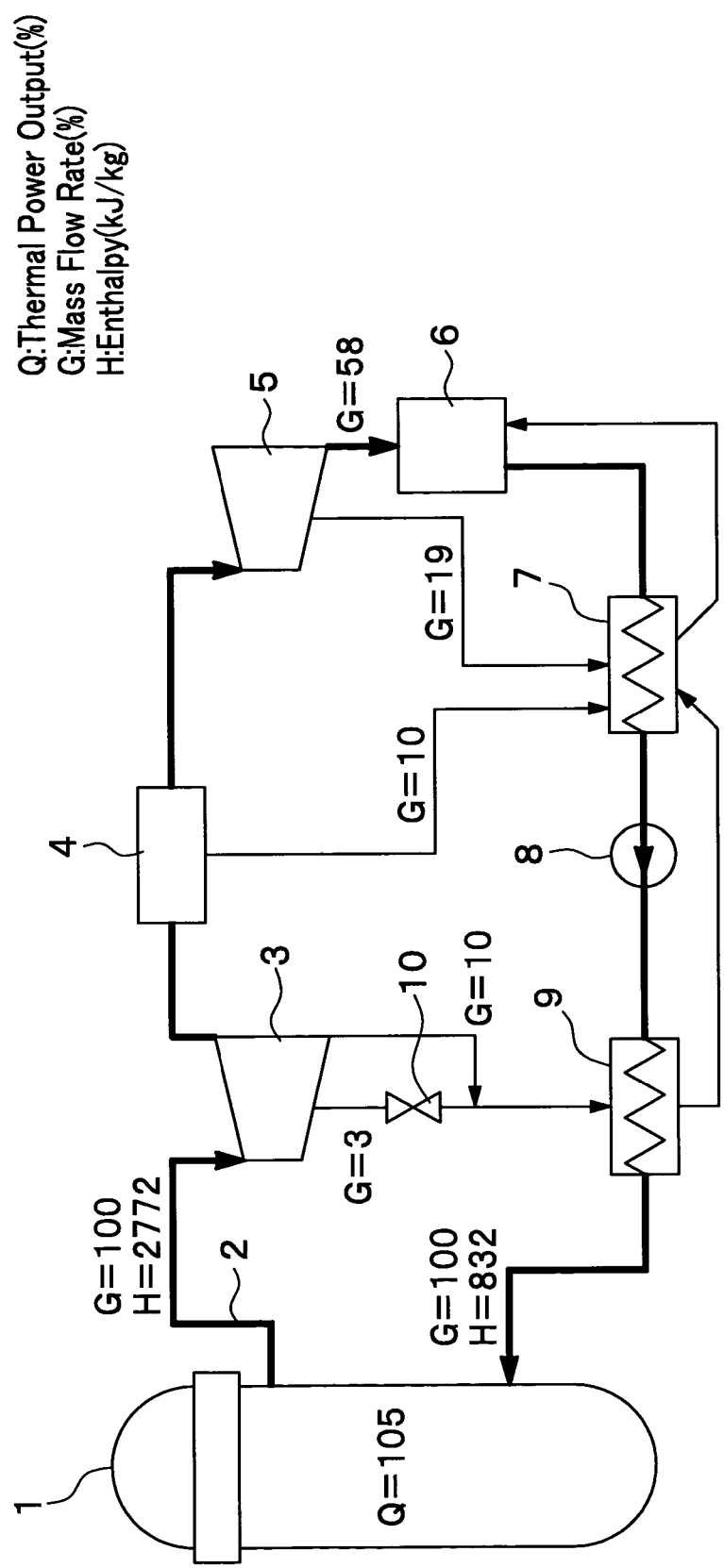
FIG. 1 is a schematic drawing of a heat balance of a boiling water reactor plant of an embodiment of the present invention.
Figure 2:
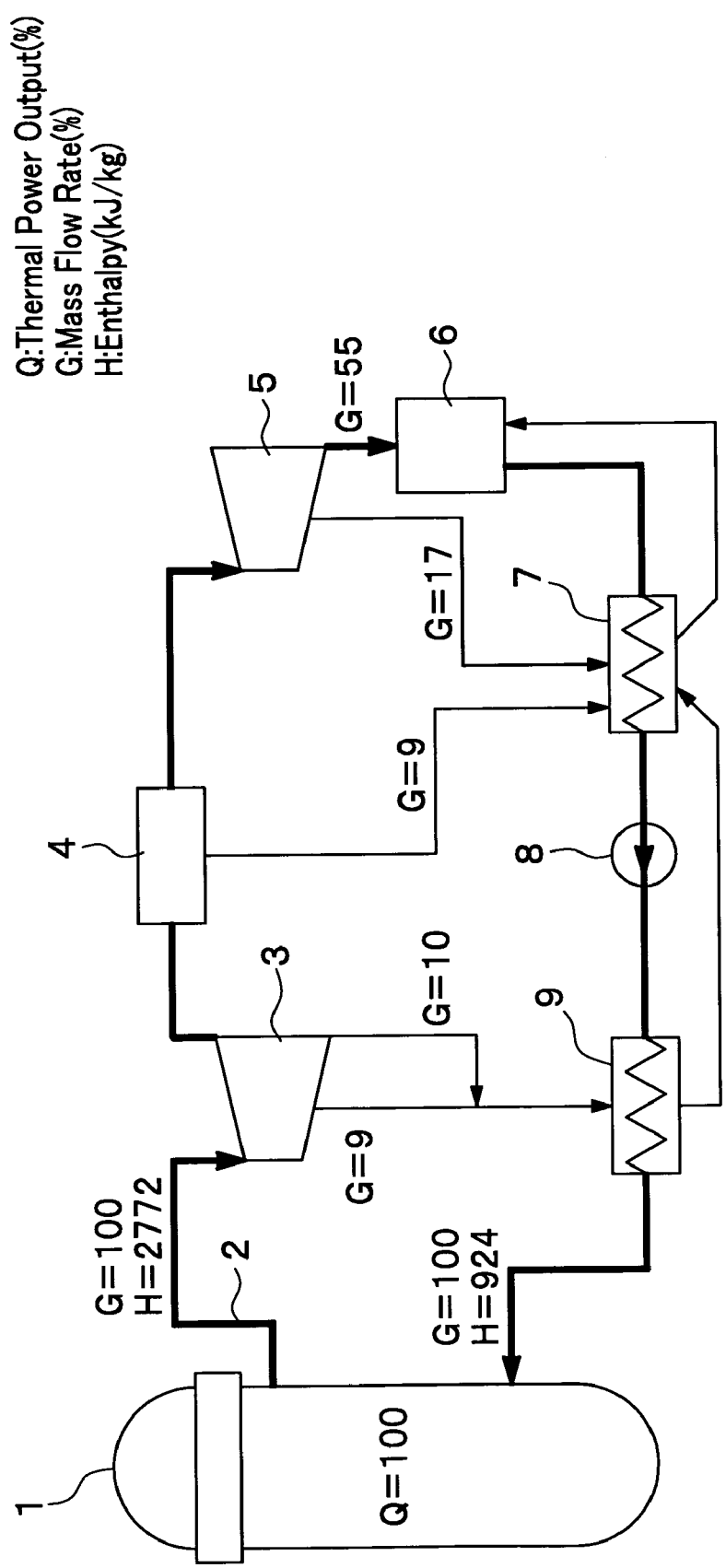
FIG. 2 is a schematic drawing of a heat balance of the boiling water reactor plant of FIG. 1 before a power uprate.
Figure 3:
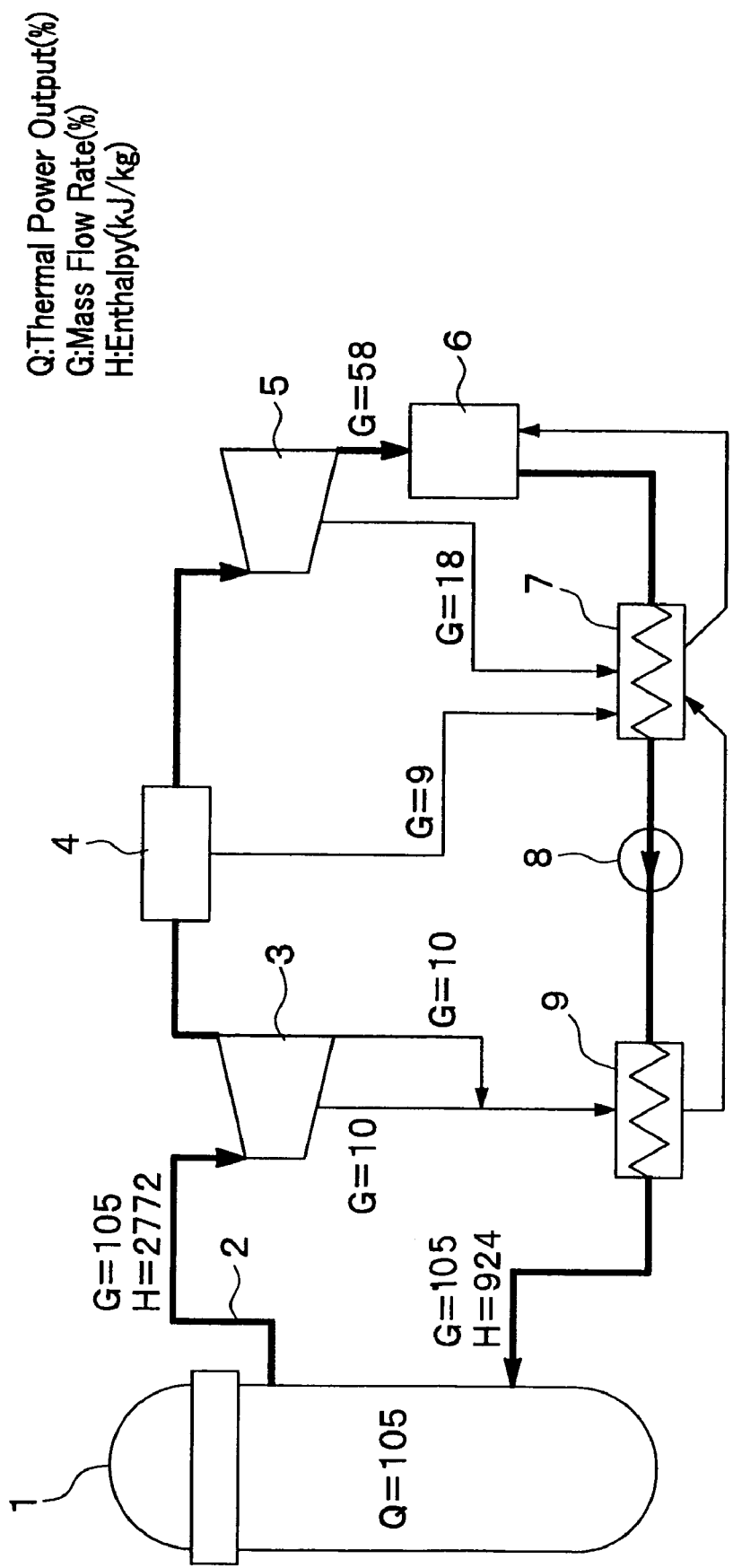
FIG. 3 is a schematic drawing of a heat balance of the boiling water reactor plant of FIG. 1 with application of a conventional power uprate method.
Figure 4:
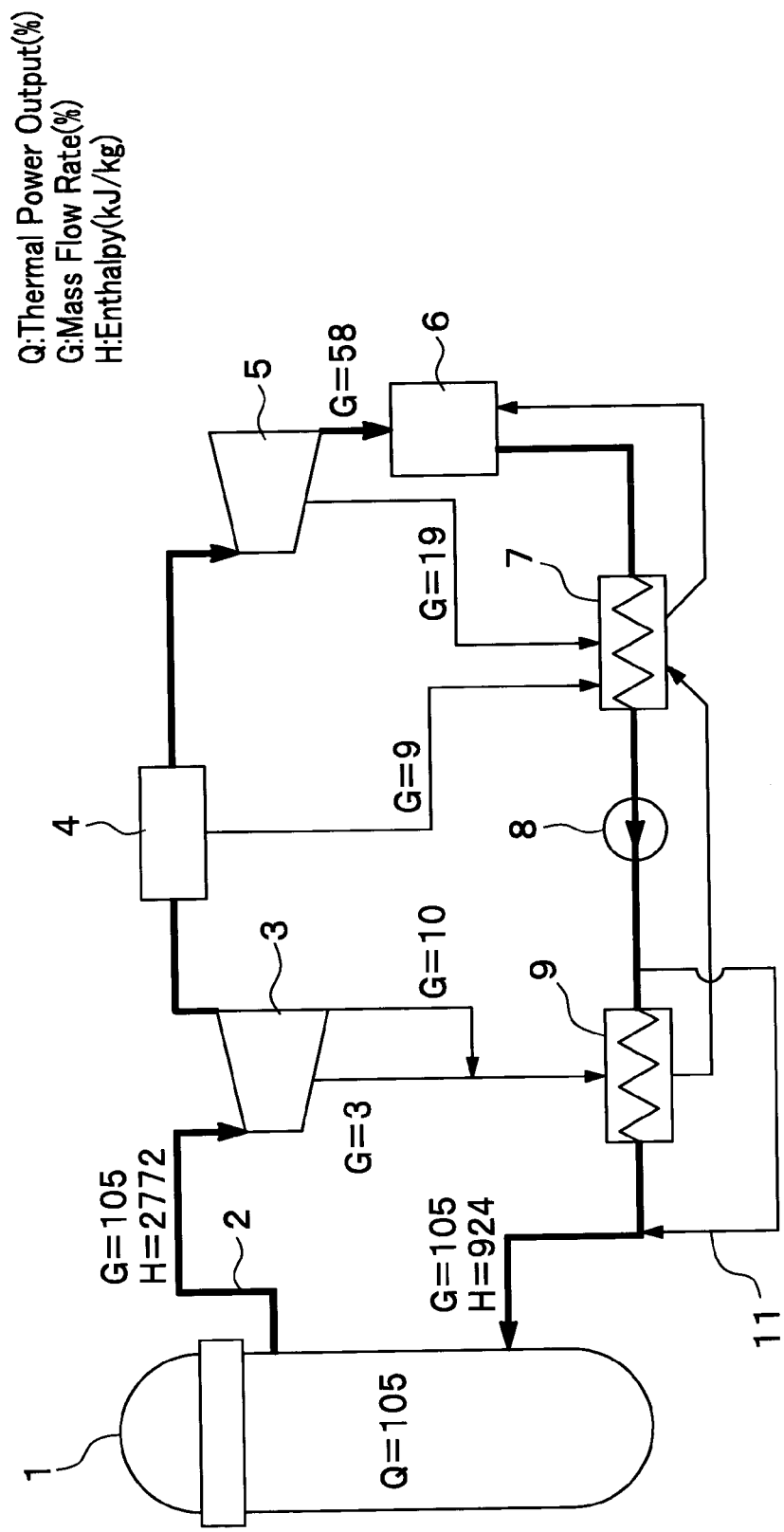
FIG. 4 is a schematic drawing of a heat balance of the boiling water reactor plant showing bypassing of a feedwater heater of an embodiment of the present invention.
Figure 5:
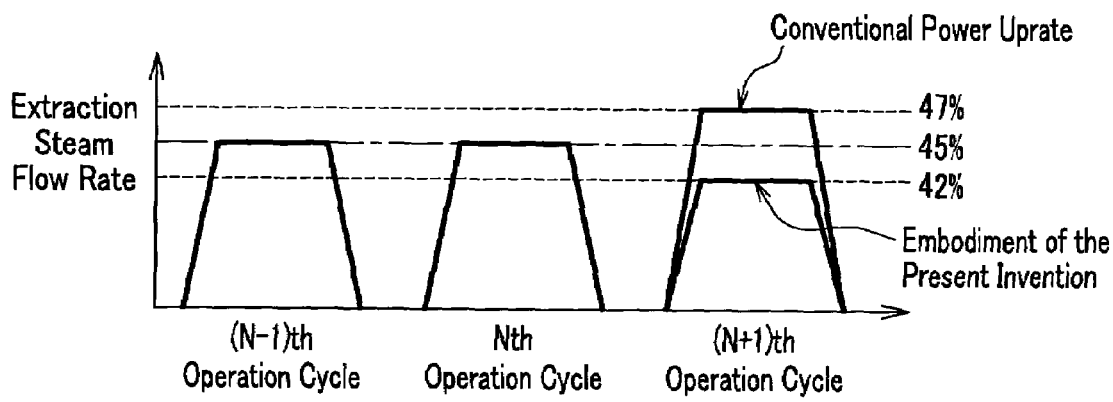
FIG. 5 is a schematic drawing of relationships between an operation cycle and a reactor thermal power output, a main steam flow rate, and an extraction steam flow rate.
Figure 5:
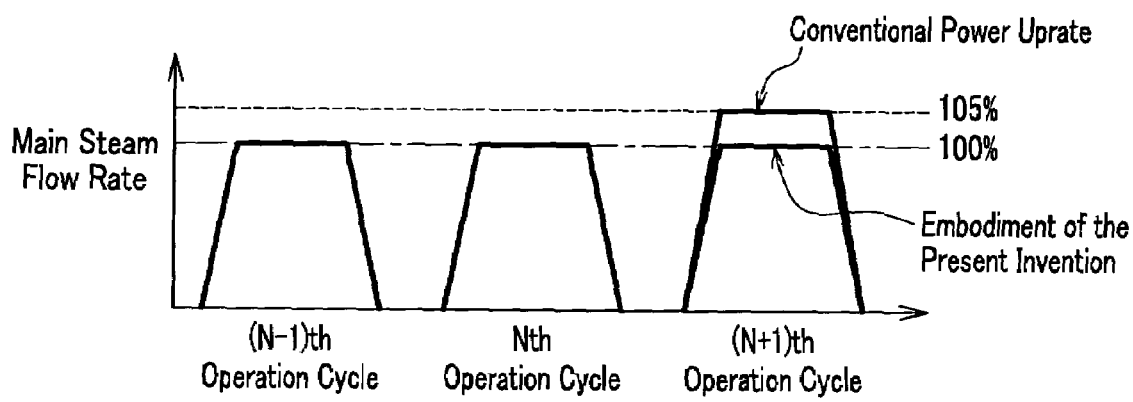
Figure 5:
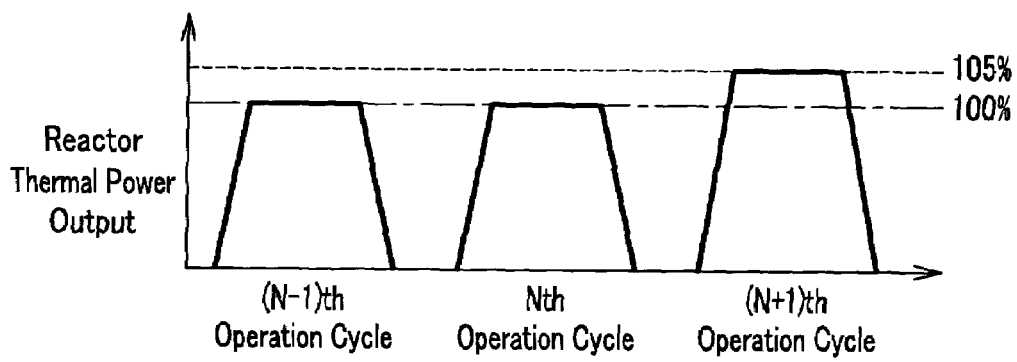
Figure 6:
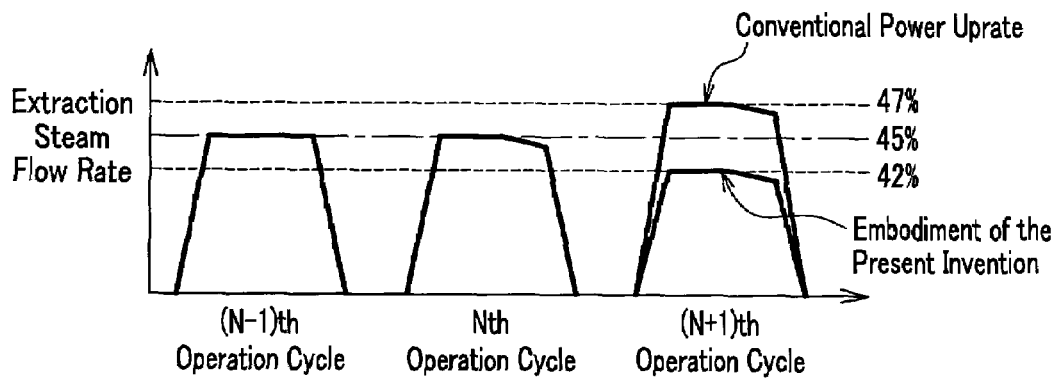
FIG. 6 is a schematic drawing of relationships between an operation cycle and a reactor thermal power output, a main steam flow rate, and an extraction steam flow rate.
Figure 6:
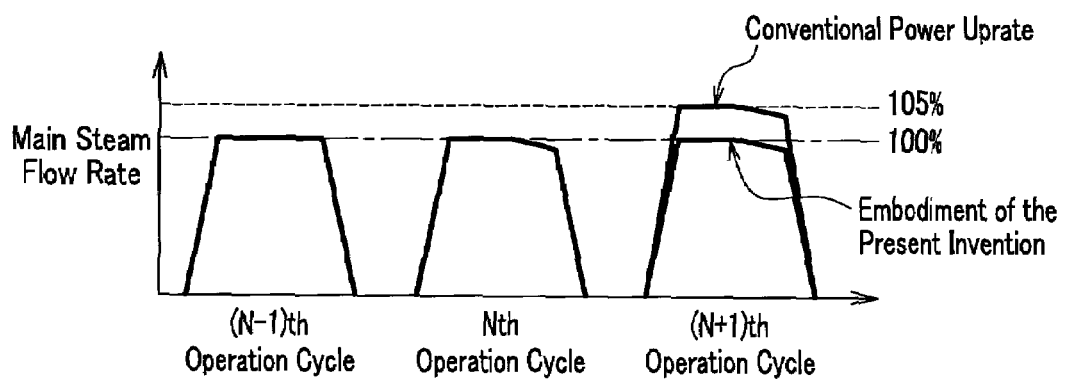
Figure 6:
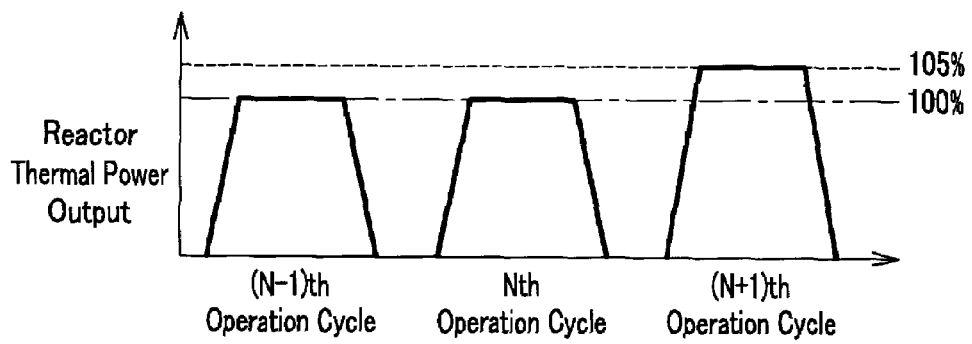

FIG. 1 shows a heat balance example of a boiling water reactor (BWR) after a power uprate according to the present invention, and FIG. 2 shows a heat balance example of the boiling water reactor before a power uprate. FIG. 3 shows a heat balance example of the boiling water reactor after a conventional power uprate. FIG. 4 shows an example for realizing a heat balance of the present invention shown in FIG. 1. Although in FIG. 1 an extraction steam amount is reduced by placing a valve at a middle area of an extraction pipe, the approach shown in FIG. 4 is applied when there is no space at the middle area of the extraction pipe and placement cost of the valve is high. In addition, each of FIGS. 5 and 6 show a conceptual drawing of an operation cycle of an embodiment of the present invention. In FIGS. 1, 2, and 3 reactor thermal power output is represented as Q, each mass flow rate of water and steam as G, and each enthalpy of water and steam as H. The reactor thermal power output Q and a mass flow rate G are expressed as ratios (%) based on their respective values at the reactor thermal power output of a reactor and a steam flow rate at an outlet of a reactor pressure vessel before a power uprate as shown in FIG. 2, and enthalpy is expressed in units of kJ/kg. In addition, each embodiment of the present invention shows a normal operation condition; operation conditions of an activation, stop time, transient state, and furthermore accident are excluded.

This embodiment of the present invention is shown in FIG. 1, and the conceptual drawing of the operation cycles for complementing the embodiment is shown in FIG. 5. FIG. 1 is a drawing schematically showing the heat balance example in a case of performing the power uprate in a boiling water reactor that comprises a recirculation pump and a jet pump within a reactor pressure vessel 1, and has a main steam pipe 2, a high pressure turbine 3 and low pressure turbine 5 connected to the main steam pipe, a moisture separator 4 between the high pressure turbine and the low pressure turbine and a condenser 6 receiving steam from low pressure turbine 5. FIG. 5 contrasts relationships between an operation cycle and a reactor thermal power output, a main steam flow rate (steam flow amount flowing in the main steam pipe from the reactor pressure vessel), and an extraction steam amount together with a conventional power uprate method. One operation cycle is defined as a period from an activation out of a stop condition of a reactor operation to a stop thereof for a fuel change.

In FIG. 5, an Nth operation cycle is shown before a power uprate method of the present invention is applied, and at this time the reactor thermal power output is Q=100%. A heat balance example before the power uprate is shown in FIG. 2. An (N+1)th operation cycle increases the reactor thermal power output by 5% and thereby makes Q=105%. An increase of the reactor thermal power output can be realized by any method, such as by: enlarging a pull-out amount of control rods in the (N+1)th cycle larger than in the Nth cycle; increasing a reactor core flow rate in the (N+1)th cycle larger than in the Nth cycle by increasing a rotation speed of the recirculation pump; and changing a kind of a fuel assembly. In addition, because applying the present invention results in lowering a temperature of feedwater supplied to the reactor pressure vessel, it can also be expected that the reactor thermal power output will naturally rise by coolant density feedback for core reactivity due to a lowering of the reactor-core-inlet coolant temperature.

In some plants an extraction steam flow rate and main steam flow rate in one cycle are changed as shown in FIG. 6. In a case of a plant adopting the operation cycle as shown in FIG. 6, it is assumed that the heat balance, extraction steam flow rate, main steam flow rate, feedwater heating amount, and the like are compared at an operation point where the main steam flow rate becomes maximum in the operation cycle excluding transients, such as activation, stop, accident/transient phenomenon occurrence time, and test operation.

When increasing the reactor thermal power output, it is necessary to increase a feedwater flow rate or to widen an enthalpy difference of a coolant between an inlet/outlet of the reactor pressure vessel in order to remove the additional increment of thermal energy from the reactor. The conventional power uprate method adopts the former method, increasing the feedwater flow rate in proportion to the reactor thermal power output. A heat balance example by the conventional power uprate method is shown in FIG. 3. As a result, in the conventional power uprate method the main steam flow rate of the (N+1)th operation cycle shown in FIG. 5 becomes 105%. The present invention adopts the latter method and is characterized by widening the enthalpy difference of the coolant between the inlet/outlet of the reactor pressure vessel by intentionally lowering a feedwater enthalpy at the inlet of the reactor pressure vessel. In order to lower the feedwater enthalpy at the inlet of the reactor pressure vessel, it is possible to decrease an extraction steam from a steam loop and thereby to decrease a steam amount sent to feedwater heaters 7, 9. However, if only an extraction steam amount is decreased, a thermal efficiency decreases and the total power generation increase is limited. Accordingly, by selectively decreasing an extraction steam amount from any of a middle area and outlet of the high pressure turbine (actually at any location from the outlet of the high pressure turbine and an inlet of the moisture separator), a steam amount flowing in the low pressure turbine is increased and thus the power generation amount is increased. Because most extraction steam from the middle area and outlet of the high pressure turbine is used at a feedwater heater downstream of a main feedwater pump 8, the power uprate method of the present invention may be viewed as a method of decreasing feedwater heating downstream of the main feedwater pump. In a case of a plant where an original extraction steam amount from the middle area and outlet of the high pressure turbine is little, in order to sufficiently decrease a feedwater temperature it may be necessary to also decrease an extraction steam amount extracted from the low pressure turbine in such a plant the extraction steam amount from the middle area and outlet of the high pressure turbine is decreased more, some extent of effect can be obtained. In the embodiment, in spite of increasing the reactor thermal power output by 5% compared to that of the Nth cycle, the main steam flow rate can be made same as that of the Nth cycle. The embodiment shows an ideal power uprate method in which the main steam flow rates of the Nth and (N+1)th operation cycles are assumed to be the same, however, they need not always be entirely the same and may be increased within a range of component design margin, for example, within the design margin of the high pressure turbine.

When there are a plurality of extraction points at the middle area and outlet of the high pressure turbine, decreasing an extraction steam amount is most effective if the extraction point is selected at the most upstream side of the high pressure turbine. In this case although it is possible to place an extraction pipe flow rate adjustment valve 10 for controlling the extraction steam amount at this location, it is possible to completely close at least one extraction pipe. As a closing method, it is possible to place a shut-off valve in the extraction pipe or to plug the pipe. When an extraction pipe is completely closed, control loop instruments of for monitoring the extraction steam amount become unnecessary and operation control is also simplified. Whether controlling the extraction steam amount or completely closing the extraction pipes is preferred depends on the heat balance and the power uprate range, for example, it may be necessary to be able to adjust the steam extraction amount if an extraction steam amount per extraction pipe is high and when the extraction pipes are completely closed, a feedwater temperature lowers too much. In addition, instead of placing a shut-off valve in an extraction pipe, a feedwater flow rate flowing in a feedwater heater may be decreased. This embodiment is shown in FIG. 4, in which a feedwater heater bypass loop 11 is placed in the feedwater piping, and a part of feedwater is made to flow in the bypass loop 11. A low temperature coolant flowing in the bypass loop 11 bypasses at least one feedwater heater and then mixes with high temperature main feedwater. Thus a lowering of a feedwater temperature can be realized at an inlet of the reactor pressure vessel.

Because when augmenting the reactor thermal power output and increasing the power generation amount of a nuclear power plant, the embodiment can suppress an increase of a feedwater flow rate and a main steam flow rate, it can suppress an increase of a load on a feedwater pipe, main steam pipe, and pressure vessel internals. Compared to the case of simply decreasing the extraction steam amount, the present invention can suppress the lowering of the thermal efficiency and obtain a larger power output. In addition, although in an extensive power uprate by a conventional power uprate method it generally becomes necessary to change the high pressure turbine, with the present invention a power uprate range performable without a change of the high pressure turbine widens compared to the conventional method. Further, as the feedwater temperature lowers, a thermal margin (corresponding to an MCPR (Minimum Critical Power Ratio) in a case of the BWR) of a reactor core increases, there is also the benefit of an increase of a design margin compared to the conventional method. Although in a power uprate a pressure loss and stability of the reactor core deteriorates, in the power uprate method of the present invention a void fraction of the reactor core becomes lower and an absolute value of void coefficient of the reactor core becomes larger, and thus the pressure loss of the reactor core is reduced, and the deterioration of the stability of the reactor core is also suppressed. The decrease of the pressure loss of the reactor core means that an increase of a load on the jet pump and recirculation pump for recirculating a coolant by a power uprate can also be suppressed. Because an increase in the amount of generation steam in the reactor core also becomes small compared to the increase of the thermal power output, an increase of carry under that occurs due to a steam entrainment into recirculation water is also small, and even in an extensive power uprate, it becomes easy to ensure a flow window. A direct-cycle nuclear power plant other than the boiling water reactor may also have a power uprate by a similar method.

Table 1 shows a relationship among a reactor thermal power output, main steam flow rate, extraction steam flow rate, and feedwater enthalpy when applying the power uprate method of the embodiment to various output increase amounts. The reactor thermal power output and the main steam flow rate show ratios in the case of a reactor thermal power output of 100%, and the extraction steam flow rate shows a ratio for the main steam flow rate in the case of the reactor thermal power output of 100%. As seen from Table 1, even when making the reactor thermal power output 110%, the power uprate method of the present invention is widely applicable. A reason why the output is not shown only until 110% in Table 1 is that in a higher power uprate a change of the moisture separator and the like becomes necessary; if the moisture separator is changed or combined with a reactor pressure increase, the power uprate method of the present invention is more extensively applicable.

Generally in the boiling water reactor a reactor thermal power output may be increased to 102% solely by improving measurement accuracy of a feedwater flowmeter and the like. Therefore, the present invention has greater applicability to a power uprate in ranges above 102%. Furthermore, in the power uprate up to a reactor thermal power output of 105%, it is generally unnecessary to extensively change system plant components, such as a change of the high pressure turbine. Using the present invention, particularly a large effect can be obtained because the change of the high pressure turbine becomes unnecessary even in the power uprate exceeding the reactor thermal power output 105%.

TABLE 1

| Reactor thermal power output (%) | Main Steam Flow Rate (%) | Extraction Steam Flow Rate (%) | Feedwater Enthalpy (kJ/kg) |
|---|---|---|---|
| 100 | 100 | 45 | 924 |
| 103 | 100 | 43 | 869 |
| 105 | 100 | 42 | 831 |
| 107 | 100 | 40 | 795 |
| 110 | 100 | 38 | 739 |
| 110 | 105 | 42 | 831 |

Next will be shown an embodiment of the present invention applied to a pressurized water reactor (PWR) of an indirect cycle nuclear power plant.

Figure 7:
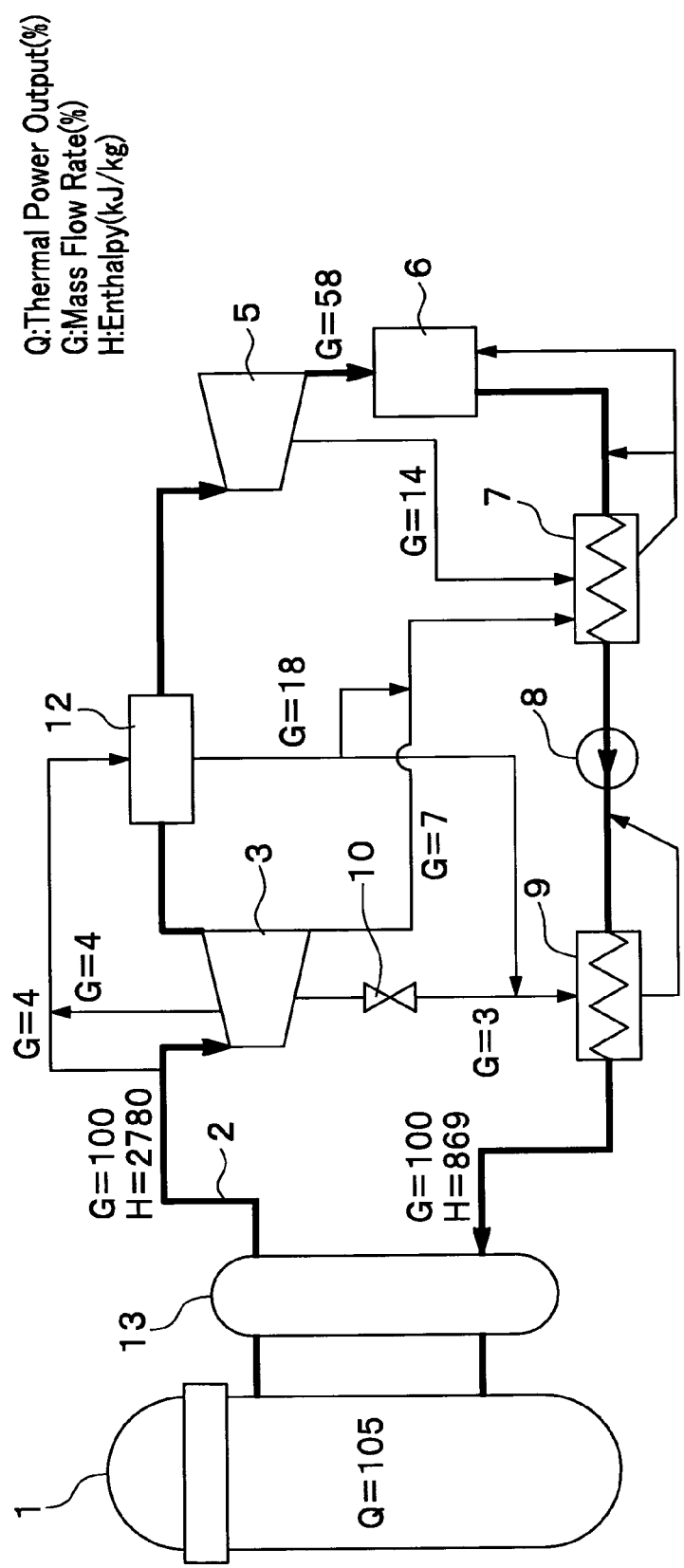
FIG. 7 is a schematic drawing of a heat balance of a pressurized water reactor plant of an embodiment of the present invention.
Figure 8:
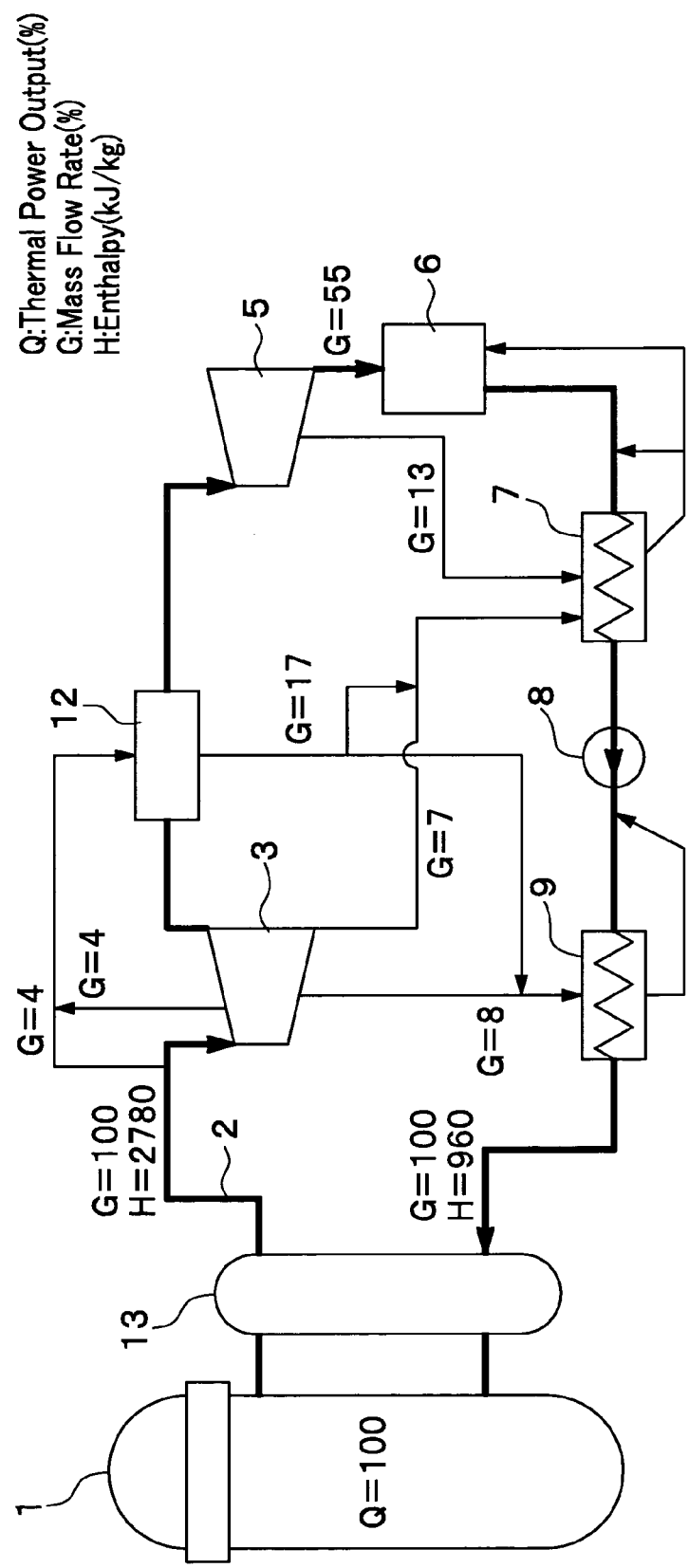
FIG. 8 is a schematic drawing of a heat balance of the pressurized water reactor plant of FIG. 7 before a power uprate.
Figure 9:
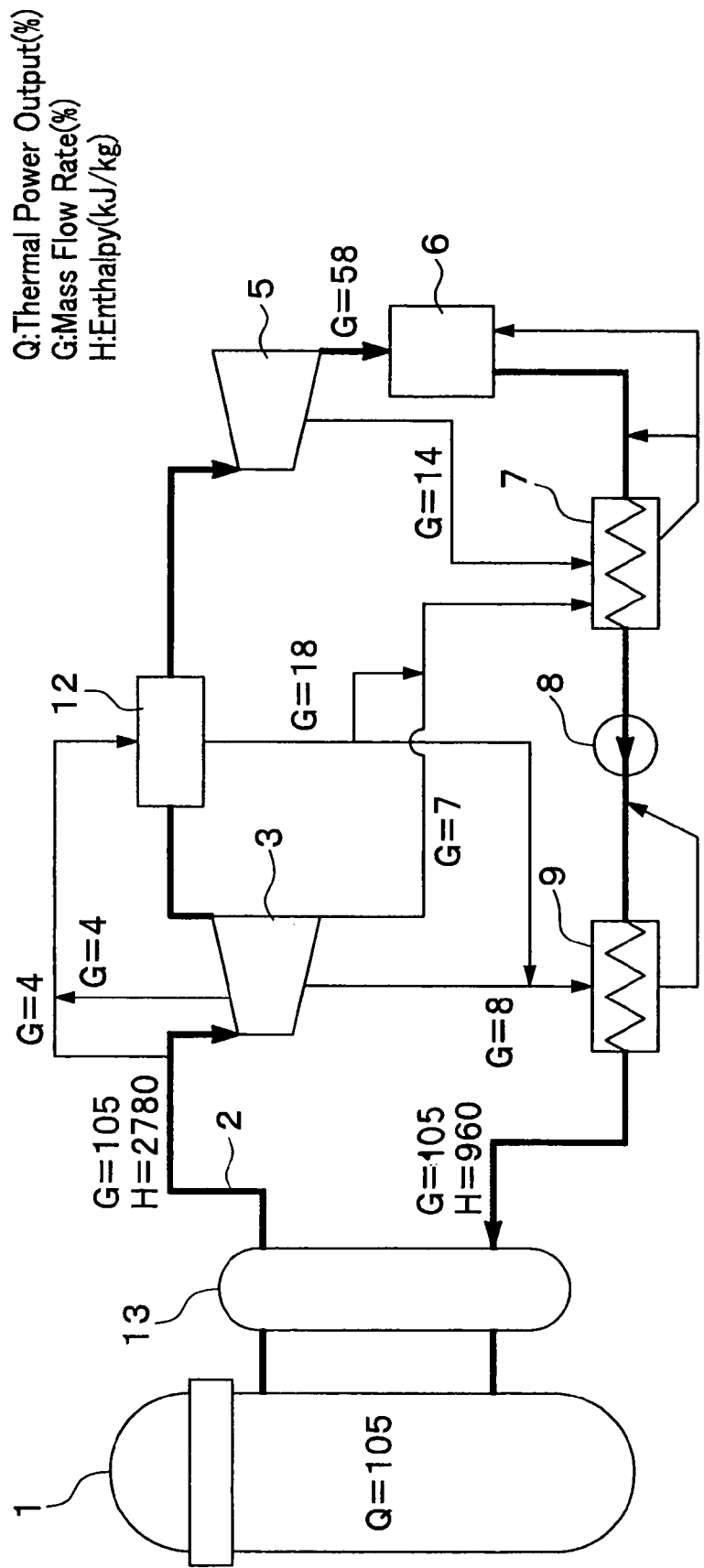
FIG. 9 is a schematic drawing of a heat balance of the pressurized water reactor plant of FIG. 7 with application of a conventional power uprate method.

FIG. 7 shows a heat balance example of the pressurized water reactor of the present embodiment after a power uprate, and FIG. 8 shows a heat balance example of the pressurized water reactor before a power uprate. FIG. 9 shows a heat balance of the pressurized water reactor after applying a conventional power uprate method. Each of FIGS. 5 and 6 shows the conceptual drawing of the operation cycle of one embodiment of the present invention. In FIGS. 7, 8, and 9 reactor thermal power output is represented as Q, each mass flow rate of water and steam as G, and each enthalpy of water and steam as H. The reactor thermal power output Q and a mass flow rate G are expressed as ratios (%) based on their respective values at the reactor thermal power output and steam flow rate (steam amount flowing in a secondary main steam pipe from a steam generator) of a reactor before a power uprate as shown in FIG. 8, and enthalpy is expressed in units of kJ/kg. A heat exchange amount at a steam generator is an amount where a heat leak in a primary loop is subtracted from a reactor thermal power output, and because a normal heat leak amount is sufficiently small compared to the reactor thermal power output, the heat exchange amount at the steam generator and the reactor thermal power output are assumed equal.

This embodiment of the present invention is shown in FIG. 7, and the conceptual drawing of the operation cycle for the embodiment is shown in FIG. 5. FIG. 7 schematically shows a heat balance example in the pressurized water reactor that comprises a reactor pressure vessel 1, a steam generator 13 transferring heat generated at a reactor core within the reactor pressure vessel to a secondary loop, a main steam pipe 2 leading secondary loop steam going out of the steam generator, a high pressure turbine 3 and low pressure turbine 5 connected to the main steam pipe, a moisture separator and heater 12 between the high pressure turbine and the low pressure turbine, and a condenser 6 receiving steam from low pressure turbine 5. FIG. 5 contrasts relationships between an operation cycle and a reactor thermal power output, a main steam flow rate, and an extraction steam amount in a case of using the embodiment together with a conventional power uprate method. One operation cycle is defined as a period from a reactor activation to a reactor operation stop for a fuel change.

In FIG. 5 an Nth operation cycle is shown before an power uprate method of the present invention is applied, and at this time the reactor thermal power output is Q=100%. A heat balance example before the power uprate is shown in FIG. 8. An (N+1)th operation cycle increases the reactor thermal power output by 5% and thus makes Q=105%. An increase of the reactor thermal power output can be realized by any method, such as by: enlarging a pull-out amount of control rods in the (N+1)th cycle larger than in the Nth cycle; and changing a kind of a fuel assembly.

In some plants an extraction steam flow rate and main steam flow rate in one cycle are changed as shown in FIG. 6. In a case of a plant adopting the operation cycle as shown in FIG. 6, it is assumed that the heat balance, extraction steam flow rate, main steam flow rate, feedwater heating amount, and the like are compared at an operation point where the main steam flow rate becomes maximum in the operation cycle excluding transients, such as activation, stop, accident/transient phenomenon occurrence time, and test operation.

When increasing the reactor thermal power output, it is necessary to increase a primary coolant flow rate into the reactor pressure vessel and a secondary feedwater flow rate into the steam generator, or to enlarge an enthalpy difference of a primary coolant between an inlet/outlet of the reactor pressure vessel and that of a secondary coolant between an inlet/outlet of the steam generator in order to remove the additional increment of thermal energy from the reactor. The conventional power uprate method adopts the former method, increasing the primary coolant flow rate and the secondary feedwater flow rate in proportion to the reactor thermal power output. A heat balance example by the conventional power uprate method is shown in FIG. 9. As a result, in the conventional power uprate method the main steam flow rate of the (N+1)th operation cycle shown in FIG. 5 becomes 105%. The present invention adopts the latter method and is characterized by enlarging the enthalpy difference of the secondary coolant between the inlet/outlet of the reactor pressure vessel with intentionally lowering a secondary feedwater enthalpy at the inlet of the steam generator. In order to lower the feedwater enthalpy at the inlet of the reactor pressure vessel, although it is possible to decrease an extraction steam from a steam loop and thereby to decrease a steam amount sent to the feedwater heaters 7, 9. However, if only an extraction steam amount is decreased, thermal efficiency decreases and the total power generation increase is limited. Accordingly, by selectively decreasing an extraction steam amount from any of a middle area and outlet of the high pressure turbine (actually at any location from the outlet of the high pressure turbine and an inlet of the moisture separator), a steam amount flowing in the low pressure turbine is increased and thus the power generation amount is increased. Because most extraction steam from the middle area and outlet of the high pressure turbine is used at a feedwater heater downstream of a main feedwater pump 8, the power uprate method of the present invention may be viewed as a method of decreasing feedwater heating downstream of the main feedwater pump. In a case of a plant where an original extraction steam amount from the middle area and outlet of the high pressure turbine is little, in order to sufficiently decrease a feedwater temperature it may be is necessary to also decrease an extraction steam amount extracted from the low pressure turbine. If in such a plant the extraction steam amount from the middle area and outlet of the high pressure turbine is decreased more, some extent of effect can be obtained. In the embodiment, in spite of increasing the reactor thermal power output by 5% compared to that of the Nth cycle, the main steam flow rate can be made same as that of the Nth cycle. The embodiment shows an ideal power uprate method in which the main steam flow rates of the Nth and (N+1)th operation cycles are assumed to be the same, however, they need not always be entirely the same and may be increased within a range of component design margin, for example, within the design margin of the high pressure turbine.

Figure 10:
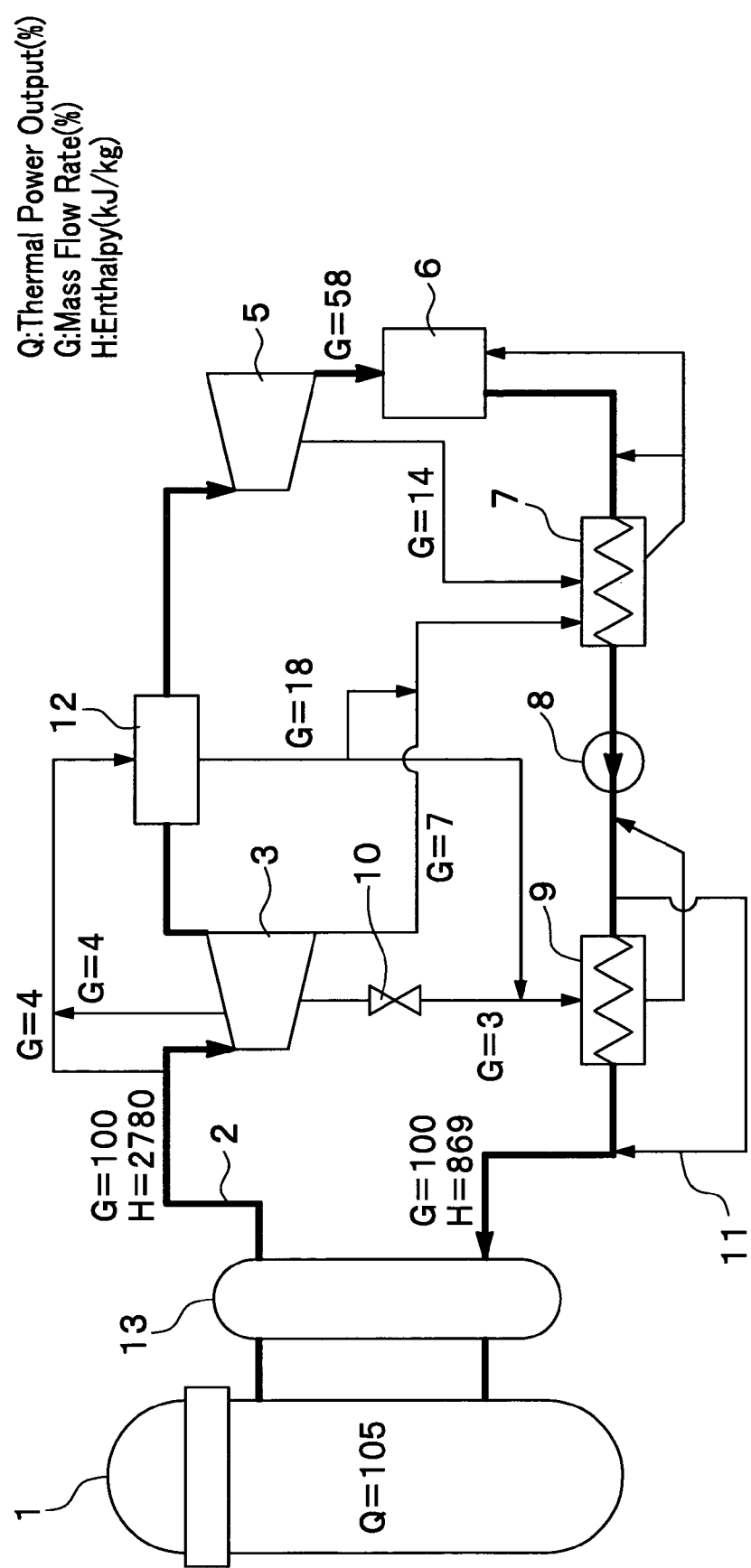
FIG. 10 is a schematic drawing of a heat balance of the pressurized water reactor plant showing bypassing of a feedwater heater of an embodiment of the present invention.

When there are a plurality of extraction points at the middle area and outlet of the high pressure turbine, decreasing an extraction steam amount is most effective if the extraction point is selected at the most upstream side of the high pressure turbine. In this case although it is possible to place an extraction pipe flow rate adjustment valve 10 for controlling the extraction steam amount at this location, it is possible to completely close at least one extraction pipe. As a closing method, it is possible to place a shut-off valve in the extraction pipe or to plug the pipe. When an extraction pipe is completely closed, control loop instruments for monitoring the extraction steam amount become unnecessary and operation control is also simplified. Whether controlling the extraction steam amount or completely closing the extraction pipes is preferred depends on the heat balance and the power uprate range, for example, it may be necessary to be able to adjust the steam extraction amount if an extraction steam amount per extraction pipe is high and when the extraction pipes are completely closed, a feedwater temperature lowers too much. In addition, instead of placing a shut-off valve in an extraction pipe, a feedwater flow rate flowing in a feedwater heater may be decreased. This embodiment is shown in FIG. 10, and it shows an example for realizing a heat balance of the present invention shown in FIG. 7. Although in FIG. 7 an extraction steam amount is reduced by placing a valve at a middle area of an extraction pipe, a method shown in FIG. 10 is applied when there is no space at the middle area of the extraction pipe and placement cost of the valve is high. In this embodiment a feedwater heater bypass loop 11 is placed in the feedwater piping, and a part of feedwater flow is made to flow in the bypass loop 11. A low temperature coolant flowing in the bypass loop 11 bypasses at least one feedwater heater and then mixes with high temperature main feedwater. Thus a lowering of a feedwater temperature can be realized at an inlet of the reactor pressure vessel.

Because when augmenting the reactor thermal power output and increasing the power generation amount of a nuclear power plant, the embodiment can suppress an increase of a feedwater flow rate and a main steam flow rate, it can suppress an increase of a load on the feedwater pipe, main steam pipe, and steam generator. It is also possible to lower the reactor pressure vessel inlet temperature of a primary loop without increasing the primary coolant flow rate, and in this case it is more effective to suppress the increase of a load on the steam generator and a load on the primary coolant pump is also reduced. Furthermore, if the reactor pressure vessel inlet temperature of the primary loop lowers, a thermal margin (corresponding to a DNBR (Departure from Nucleate Boiling Ratio) in the case of the PWR) of a reactor core increases, there is also the benefit of an increase of a design margin compared to the conventional method. A indirect-cycle nuclear power plant other than the pressurized water reactor may also have a power uprate by a similar method.

Thus, although the embodiments of the present invention are described, the invention is not limited thereto, and various variations are available without departing from the spirit and scope of the invention.

What is claimed is:

1. An operation method of a nuclear power plant for augmenting plant thermal power output of a second operation cycle above a predefined 100% power level of a first operation cycle, said nuclear power plant including
    a reactor,
    a main steam line from a reactor outlet to a high pressure turbine inlet,
    a high pressure steam loop from the high pressure turbine inlet to an inlet of a moisture separator between the high pressure turbine and a low pressure turbine,
    a low pressure steam loop from the inlet of said moisture separator through said low pressure turbine to an inlet of a condenser for condensing steam discharged from the low pressure turbine,
    a feedwater heater for heating feedwater supplied from said condenser, and
    a feedwater loop for leading feedwater discharged from the feedwater heater to a reactor inlet,
    wherein steam generated in the reactor is supplied from the reactor outlet to the high pressure loop,
    comprising the steps of:
    operating the nuclear power plant in a first operation cycle at a first thermal power level with a first mass flow rate of steam extracted from said high pressure steam loop and supplied to said feedwater heater for heating feedwater; and
    after completion of the first operation cycle, setting a second mass flow rate of extraction steam from the high pressure steam loop in a second operation cycle lower than the first mass flow rate of extraction steam such that an enthalpy of feedwater exiting the feedwater heater in the second operating cycle is lower than an enthalpy of feedwater exiting the feedwater heater in said first operation cycle.

2. An operation method of a nuclear power plant for augmenting plant thermal power output of a second operation cycle above a predefined 100% power level of a first operation cycle, said nuclear power plant including
    a reactor,
    a main steam line from a reactor outlet to a high pressure turbine inlet,
    a high pressure steam loop from the high pressure turbine inlet to an inlet of a moisture separator between the high pressure turbine and a lower pressure turbine,
    a low pressure steam loop from the inlet of said moisture separator through said low pressure turbine to an inlet of a condenser for condensing steam discharged from the low pressure turbine,
    a feedwater heater for heating feedwater supplied from said condenser, and
    a feedwater loop for leading feedwater discharged from the feedwater heater to a reactor inlet,
    wherein steam generated in the reactor is supplied from the reactor outlet to the high pressure loop,
    comprising the steps of:
    operating the nuclear power plant in a first operation cycle at a first thermal power level with a first mass flow rate of steam extracted from said high pressure steam loop and supplied to said feedwater heater for heating feedwater and a first mass flow rate of steam extracted from said low pressure steam loop and supplied to said feedwater heater for heating feedwater; and
    after completion of the first operation cycle, setting a second extraction steam mass flow rate from the high pressure steam loop and a second extraction steam mass flow rate from the low pressure steam loop in said second operation cycle smaller than said first mass flow rates of extraction steam,
    such that an enthalpy of feedwater exiting the feedwater heater in the second operating cycle is lower than an enthalpy of feedwater exiting the feedwater heater in said first operation cycle, and a ratio of decrease between said first high pressure extraction steam mass flow rate and said second high pressure extraction steam mass flow rate is larger than a ratio of decrease between said first low pressure extraction steam mass flow rate and said second low pressure extraction steam mass flow rate.

* * * * *